(12) United States Patent
Vanska et al.

(10) Patent No.: US 7,450,966 B2
(45) Date of Patent: *Nov. 11, 2008

(54) METHOD AND DEVICE FOR STORING AND ACCESSING PERSONAL INFORMATION

(75) Inventors: Marko Vanska, Espoo (FI); Ian Nordman, Sipoo (FI); Joakim Granholm, Helsinki (FI); Vesa Jutila, Espoo (FI)

(73) Assignee: Nokia Corporation, Espoo (FI)

( * ) Notice: Subject to any disclaimer, the term of this patent is extended or adjusted under 35 U.S.C. 154(b) by 261 days.

This patent is subject to a terminal disclaimer.

(21) Appl. No.: 11/279,190

(22) Filed: Apr. 10, 2006

(65) Prior Publication Data

US 2007/0191058 A1    Aug. 16, 2007

Related U.S. Application Data

(63) Continuation of application No. 10/174,405, filed on Jun. 17, 2002, now Pat. No. 7,047,041.

(51) Int. Cl.
*H04Q 7/20* (2006.01)
*H04Q 7/32* (2006.01)

(52) U.S. Cl. ................. 455/558; 455/550.1; 455/412.1; 455/414.1; 455/566; 455/557; 705/14

(58) Field of Classification Search ............. 455/414.1, 455/412.1, 412.2, 414.3, 414.4, 403, 422.1, 455/445, 558, 550.1, 456.1–457, 557, 566, 455/414.2; 705/14

See application file for complete search history.

(56) References Cited

U.S. PATENT DOCUMENTS 5,250,789 A    10/1993    Johnsen (Continued)

FOREIGN PATENT DOCUMENTS

DE    10042914    4/2001

(Continued)

OTHER PUBLICATIONS

"vCard: The Electronic Business Card", Version 2.1, www.imc.org/pdi/vcardwhite.html, Download Date Feb. 5, 2002, 5 pages.

(Continued)

*Primary Examiner*—Keith T Ferguson
(74) *Attorney, Agent, or Firm*—Morgan & Finnegan, L.L.P.

(57) ABSTRACT

Basic personal data of an individual is stored as different data files based on content or intended use. The selection of personal data for inclusion in a data file may be performed in accordance with service provider requests or by the end user, preferably with the assistance of templates. Each data file is assigned a unique identifier and is preferably stored in a network server (or, alternatively, in the user's mobile device). The data files may be organized into groups according to content or intended use. For each of the stored files, a graphical symbol is stored in the user's mobile device. When displayed to the user, the symbol preferably resembles a card. Moreover, each group of data files is preferably displayed as a pack of cards. In this manner, the organization of the cards is such that the user can easily select a card needed to obtain a service.

16 Claims, 8 Drawing Sheets

U.S. PATENT DOCUMENTS

| | | |
|---|---|---|
| 5,412,193 A | 5/1995 | Swartz et al. |
| 5,415,167 A | 5/1995 | Wilk |
| 5,478,989 A | 12/1995 | Shepley |
| 5,493,692 A | 2/1996 | Theimer et al. |
| 5,508,695 A | 4/1996 | Nelson et al. |
| 5,550,535 A | 8/1996 | Park |
| 5,559,707 A | 9/1996 | DeLorme et al. |
| 5,561,702 A | 10/1996 | Lipp et al. |
| 5,561,705 A | 10/1996 | Allard et al. |
| 5,572,653 A | 11/1996 | DeTemple et al. |
| 5,581,630 A | 12/1996 | Bonneau, Jr. |
| 5,592,375 A | 1/1997 | Salmon et al. |
| 5,629,981 A | 5/1997 | Nerlikar |
| 5,630,068 A | 5/1997 | Vela et al. |
| 5,642,303 A | 6/1997 | Small et al. |
| 5,649,114 A | 7/1997 | Deaton et al. |
| 5,649,187 A | 7/1997 | Hornbuckle |
| 5,682,142 A | 10/1997 | Loosmore et al. |
| 5,715,314 A | 2/1998 | Payne et al. |
| 5,729,697 A | 3/1998 | Schkolnick et al. |
| 5,732,229 A | 3/1998 | Dickinson |
| 5,764,736 A | 6/1998 | Shachar et al. |
| 5,764,739 A | 6/1998 | Patton et al. |
| 5,794,142 A | 8/1998 | Vanttila |
| 5,799,091 A | 8/1998 | Lodenius |
| 5,821,513 A | 10/1998 | O'Hagan et al. |
| 5,886,646 A | 3/1999 | Watanabe et al. |
| 5,929,778 A | 7/1999 | Asama et al. |
| 5,948,040 A | 9/1999 | DeLorme et al. |
| 5,949,335 A | 9/1999 | Maynard |
| 5,959,530 A | 9/1999 | Lupien, Jr. et al. |
| 5,970,469 A | 10/1999 | Scroggie et al. |
| 5,979,757 A | 11/1999 | Tracy et al. |
| 6,023,241 A | 2/2000 | Clapper |
| 6,026,375 A | 2/2000 | Hall et al. |
| 6,029,064 A | 2/2000 | Farris et al. |
| 6,055,442 A | 4/2000 | Dietrich |
| 6,138,009 A | 10/2000 | Birgerson |
| 6,154,745 A | 11/2000 | Kari et al. |
| 6,177,860 B1 | 1/2001 | Cromer et al. |
| 6,196,466 B1 | 3/2001 | Schuessler |
| 6,259,367 B1 | 7/2001 | Klein |
| 6,292,668 B1 | 9/2001 | Alanara et al. |
| 6,295,506 B1 | 9/2001 | Heinonen et al. |
| 6,308,203 B1 | 10/2001 | Itabashi et al. |
| 6,311,058 B1 | 10/2001 | Wecker et al. |
| 6,327,570 B1 | 12/2001 | Stevens |
| 6,332,062 B1 | 12/2001 | Phillips et al. |
| 6,356,543 B2 | 3/2002 | Hall et al. |
| 6,370,389 B1 | 4/2002 | Isomursu et al. |
| 6,389,278 B1 | 5/2002 | Singh |
| 6,397,057 B1 | 5/2002 | Malackowski et al. |
| 6,401,085 B1 | 6/2002 | Gershman et al. |
| 6,446,004 B1 | 9/2002 | Cao et al. |
| 6,446,208 B1 | 9/2002 | Gujar et al. |
| 6,456,039 B1 | 9/2002 | Lauper et al. |
| 6,462,660 B1 | 10/2002 | Cannon et al. |
| 6,491,217 B2 | 12/2002 | Catan |
| 6,577,901 B2 | 6/2003 | Thompson |
| 6,587,684 B1 | 7/2003 | Hsu et al. |
| 6,611,673 B1 | 8/2003 | Bayley et al. |
| 6,622,017 B1 | 9/2003 | Hoffman |
| 6,647,269 B2 | 11/2003 | Hendrey et al. |
| 6,650,761 B1 | 11/2003 | Rodriguez et al. |
| 6,687,793 B1 | 2/2004 | Thomas et al. |
| 7,135,976 B2 | 11/2006 | Neff et al. |
| 2001/0011247 A1 | 8/2001 | O'Flaherty et al. |
| 2001/0018349 A1 | 8/2001 | Kinnunen et al. |
| 2001/0041566 A1 | 11/2001 | Xanthos et al. |
| 2001/0054115 A1 | 12/2001 | Ferguson et al. |
| 2002/0039909 A1 | 4/2002 | Rankin |
| 2002/0086680 A1 | 7/2002 | Hunzinger |
| 2002/0087392 A1 | 7/2002 | Stevens |
| 2002/0087529 A1 | 7/2002 | Dutcher et al. |
| 2002/0094797 A1 | 7/2002 | Marshall et al. |
| 2002/0095456 A1 | 7/2002 | Wensheng |
| 2002/0121544 A1 | 9/2002 | Ito et al. |
| 2002/0122055 A1 | 9/2002 | Parupudi et al. |
| 2002/0130178 A1 | 9/2002 | Wan et al. |
| 2002/0151326 A1 | 10/2002 | Awada et al. |
| 2002/0165008 A1 | 11/2002 | Sashihara et al. |
| 2003/0017848 A1 | 1/2003 | Engstrom et al. |
| 2003/0019929 A1 | 1/2003 | Stewart et al. |
| 2003/0030542 A1 | 2/2003 | von Hoffmann |
| 2003/0056019 A1 | 3/2003 | Kehr et al. |
| 2003/0074566 A1 | 4/2003 | Hypponen |
| 2003/0088496 A1 | 5/2003 | Piotrowski |
| 2003/0194989 A1 | 10/2003 | Guion |
| 2004/0075675 A1 | 4/2004 | Raivisto et al. |
| 2004/0087273 A1 | 5/2004 | Perttila et al. |

FOREIGN PATENT DOCUMENTS

| | | |
|---|---|---|
| EP | 0801512 | 10/1997 |
| EP | 0853287 | 7/1998 |
| EP | 1030494 | 8/2000 |
| EP | 1059599 | 12/2000 |
| EP | 1130495 | 9/2001 |
| EP | 1130933 | 9/2001 |
| EP | 1197929 | 4/2002 |
| FI | 20022288 | 12/2002 |
| KR | 2002-0043631 | 6/2002 |
| KR | 2002-0080162 | 10/2002 |
| RU | 2116008 | 7/1998 |
| WO | WO9710558 | 3/1997 |
| WO | WO9717790 | 5/1997 |
| WO | WO9728736 | 8/1997 |
| WO | WO9746960 | 12/1997 |
| WO | WO9835469 | 8/1998 |
| WO | WO9917230 | 4/1999 |
| WO | WO9930257 | 6/1999 |
| WO | WO0001082 | 1/2000 |
| WO | WO0016507 | 3/2000 |
| WO | WO0062260 | 10/2000 |
| WO | WO0074406 | 12/2000 |
| WO | WO0106507 | 1/2001 |
| WO | WO0117297 | 3/2001 |
| WO | WO0120542 | 3/2001 |
| WO | WO0125985 | 4/2001 |
| WO | WO0139103 | 5/2001 |
| WO | WO0139108 | 5/2001 |
| WO | WO0145038 | 6/2001 |
| WO | WO0145319 | 6/2001 |
| WO | WO0147291 | 6/2001 |
| WO | WO0173687 | 10/2001 |
| WO | WO0174011 | 10/2001 |
| WO | WO0174406 | 10/2001 |
| WO | WO0175815 | 10/2001 |
| WO | WO0199410 | 12/2001 |
| WO | WO0233669 | 4/2002 |
| WO | WO2004003829 | 1/2004 |
| WO | WO2004027689 | 4/2004 |

OTHER PUBLICATIONS

"vCard Overview", www.imc.org/pdi/vcardoverview.html, Download Date Feb. 5, 2002, 3 pages.

"Products Using vCard and vCalendar Technology", www.imc.org/pdi/pdiprodslist.html, Download Date Feb. 5, 2002, 9 pages.

Mandato D. et al., "CAMP: A Context-Aware Mobile Portal", IEEE Communications Magazine, vol. 40, No. 1, Jan. 2002, pp. 2, 4 and 90-97.

Electronic User's Guide for Nokia 6310i, 9354260, Issue 1, 2002, pp. 1-117.

"Radio Frequency Identification RFID—A Basic Primer", Automatic Identification Manufacturers (AIM) Inc. White Paper, Ver. 1.2, AIM Inc. WP-98/002R2, Aug. 23, 2001, pp. 1-17.

"UMTS and mobile computer", Alexander Joseph Huber, et al., Mar. 2002, Artech House Mobile Communication Series, pp. 170-187, 231-232.

"vCard: The Electronic Business Card", A versit Consortium White Paper, Jan. 1, 1997, Version 2.1, XP-002193107, 4 pages.

Supplementary European Search Report of EP Application No. EP 03 76 0098—Date of Completion of Search: Dec. 6, 2007.

METHOD AND DEVICE FOR STORING AND ACCESSING PERSONAL INFORMATION

RELATED APPLICATION INFORMATION

This application is a continuation of U.S. application Ser. No. 10/174,405, filed Jun. 17, 2002, now U.S. Pat No. 7,047, 041.

FIELD OF THE INVENTION

This invention relates to wireless communications systems in general, and more particularly, to methods of storing, accessing and displaying information relating to an individual for use in the provisioning of services.

BACKGROUND OF THE INVENTION

The current mobile computing marketplace has increasingly focused on wireless access to both telecom and data network services. Within the data network context, such networks nowadays offer access to a plethora of different services. It has been proposed that some of these services automatically adapt to the sensed user's context and thereby tailor the service to the user's interests. This adaptation may require taking into account explicit user preferences, such as may be defined by a user profile, as well as the explicit circumstances of the user. In the likely event that the user has a variety of profiles, each corresponding to a different context or service, however, the selection of the appropriate profile for the service at hand may be a difficult and tedious task for the user.

SUMMARY OF THE INVENTION

A method and device for storing and accessing personal information are disclosed to facilitate a user's selection of data relating to a user.

An exemplary apparatus includes: a memory having program code stored thereon; and a processor disposed in communication with the memory for carrying out instructions in accordance with the stored program code, wherein the program code, when executed by the processor, causes the processor to perform: storing a plurality of card representations, wherein each of the card representations is associated with a plurality of data items; displaying the plurality of card representations; receiving a selection of one of the plurality of card representations; and transmitting a plurality of data items associated with the selected one of the card representations to a service provider to obtain a service.

In an alternate embodiment, an exemplary article of manufacture includes: a computer readable medium containing program code that when executed causes a processor to perform: storing a plurality of card representations, wherein each of the card representations is associated with a plurality of data items; displaying the plurality of card representations on a user device; receiving a selection of one of the plurality of card representations; and transmitting a plurality of data items associated with the selected one of the card representations to a service provider to obtain a service.

Other and further aspects of the present invention will become apparent during the course of the following description and by reference to the attached drawings.

DETAILED DESCRIPTION

In the following description of the various embodiments, reference is made to the accompanying drawings which form a part hereof, and in which are shown by way of illustration various embodiments in which the invention may be practiced. It is to be understood that other embodiments may be utilized and structural and functional modifications may be made without departing from the scope of the present invention.

Figure 1:
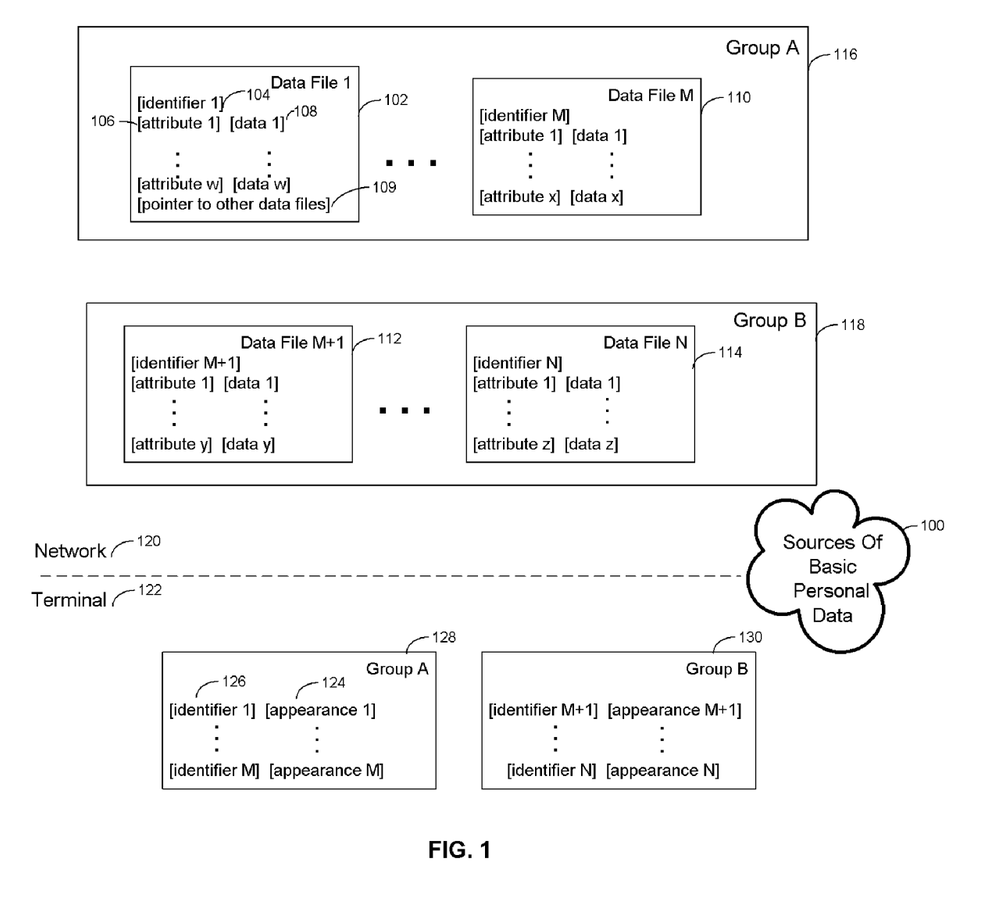
FIG. 1 is a block diagram illustrating exemplary data files including at least one data item relating to a user and the presentation format of the data item when displayed on the user's mobile terminal.

Referring now to the drawings, wherein like reference numerals refer to like parts, FIG. 1 is a block diagram illustrating exemplary data files including at least one data item relating to a user and the presentation format of the data item when displayed on the user's mobile terminal.

In one embodiment of the present invention, a user of a mobile terminal may be required to disclose one or more personal data items to a service provider in order to access a service. In an alternate embodiment, the user may wish to disclose certain personal data items to the outside world to define his visibility in a particular context, and thus, his receptiveness to certain services. In either case, these data items may be drawn from various sources of personal data 100 (FIG. 1), which, as will be discussed in detail hereinafter, may include the user, his mobile terminal, or network-based entities such as a service provider or a network operator.

The data items for a particular service or context are stored in a data file associated with the service or context, and each data file may be stored in either a network-based repository, such as a network server or proxy, or the mobile terminal 122. FIG. 1 shows several such data files 102, 110, 112 and 114 stored in a repository located in network 120. Each data file may correspond to a different service or context and includes an identifier 104 and at least one data item comprising an attribute 106 and associated data 108. The data files may be grouped according to content or intended use. Thus, in FIG. 1, data files 1 through M are shown as belonging to Group A 116. Similarly, data files M+1 through N are shown as belonging to Group B 118. It will be readily appreciated that any number of data files may be stored in any number of such groupings.

As further shown in FIG. 1, and as will be discussed in detail hereinafter in connection with FIG. 3, a data file also may include a pointer 109 to other data files, including data files within its own group and data files within other groups. Moreover, the data files also may be linked to one another and/or the various sources of personal data 100 such that the data corresponding to attributes in each data file are automatically updated whenever data corresponding to the same attributes in the other data files or the sources of personal data 100 are modified.

A data file without data corresponding to one or more attributes is referred to herein as a template, which, as will be discussed in detail hereinafter may be used to facilitate the creation of the data file. Such templates may either be downloaded from entities in the network 120 or pre-stored on the mobile terminal 122.

In accordance with one embodiment of the present invention, each data file is associated with a common "appearance" 124 or presentation format. This presentation format defines how the data items in each data file are to appear when displayed on a screen of the terminal 122. Displaying the data items in the data files using a common presentation format facilitates the user's selection of a data file either for modification or for use in requesting a service. In the embodiment shown in FIG. 1, the data file is stored in the network 120 and the presentation format is stored in the terminal 122. Whether or not the data files and the presentation formats are stored on two separate devices, the presentation formats and the data files are linked together by the identifiers (104, 126). However, in the event that a data file corresponding to a presentation format, which dictates how the data items are to be displayed, is stored in the network, the identifier 126 preferably includes the URL of the network-based server or proxy on which the data file is stored.

As further shown in FIG. 1, the presentation formats 124 are preferably grouped in the same manner as the data files (i.e., in accordance with content or intended use) to facilitate displaying together presentation formats belonging to the same group, which in turn, further facilitates the user's selection of a particular data file for use or modification. Thus, presentation formats 1 through M, corresponding to data files 1 through M are members of group A. Likewise, presentation formats M+1 through N, corresponding to data files M+1 through N are members of Group B.

As will be discussed in detail hereinafter, the presentation format is preferably that of a card having various fields for visually displaying the data in the data file on the screen of mobile terminal 122. The card may be displayed as a graphical symbol, an image or even a multimedia object. A card with one or more of the associated data depicted thereon may be displayed to a service provider's representative as proof of acquired rights or to the user as a convenient reminder of the data associated with the card. Alternatively, the card (or, more appropriately, one or more data items associated with the card) may be transmitted to a service provider over a wireless connection to initiate service reception. The wireless connection may be a Personal Area Network (e.g., IrDA or Bluetooth PANs), wireless LAN (e.g., wireless IEEE 1394, IEEE 802.11 or HiperLAN/2), wireless WAN (e.g., GSM, GPRS, etc.) or the like.

Access to a data file, and thus, the display or wireless transmission of a card, preferably requires user authentication using either password or cryptographic authentication techniques, such as Radius, Kerberos, IPsec or other protocols based on a public key exchange.

Figure 2:
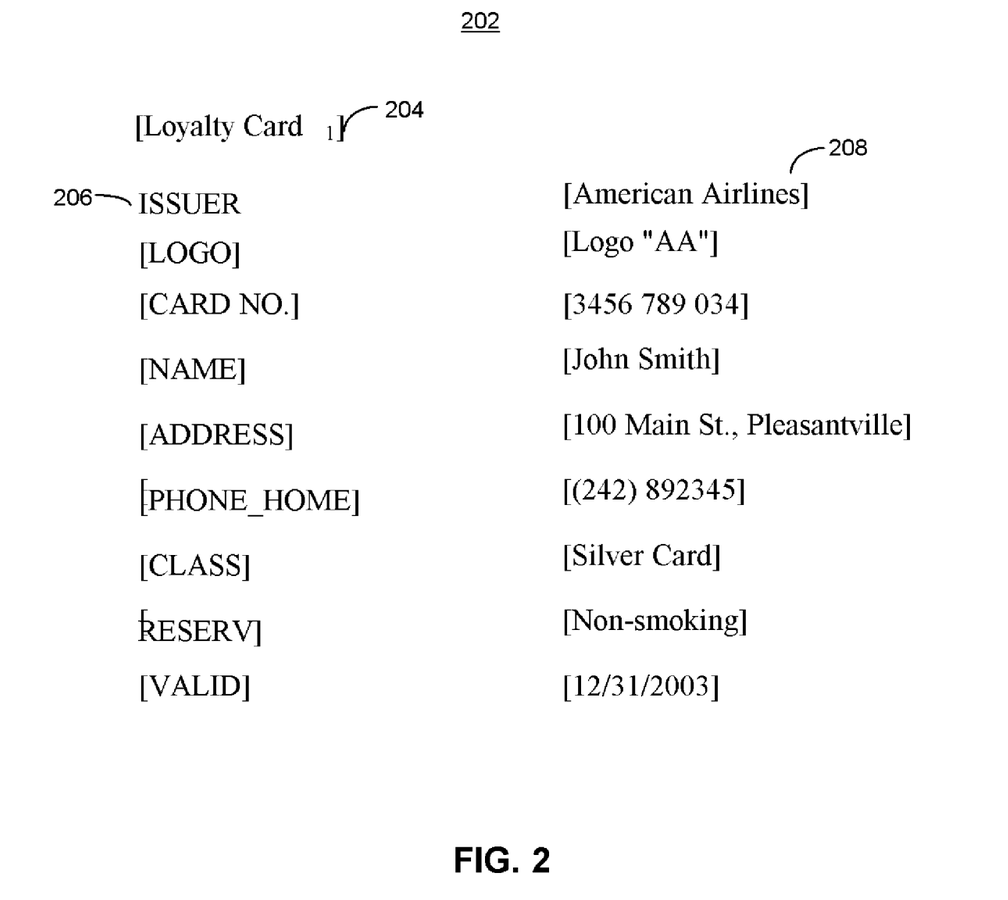
FIG. 2 illustrates an exemplary data file in greater detail.

FIG. 2 illustrates an exemplary data file in greater detail. As shown in FIG. 2, the data file 202 includes an identifier 204, which, in the exemplary data file of FIG. 2, indicates that the data file is loyalty card #1. The data file also includes a plurality of attributes 206 such as "issuer", "card no.", "name", "address", "home_phone", "class", "reservation" and "valid". As can be seen from the attribute "valid", the data file may include a date restriction on when the card either becomes valid or expires or may have some other usage rule associated therewith. The other attributes shown in FIG. 2 are self-explanatory, and thus, will not be discussed herein. As further shown in FIG. 2, data items 208 corresponds to each attribute 206. As can be seen from the data items 208, the data file is one corresponding to a loyalty card for American Airlines.

Figure 3:
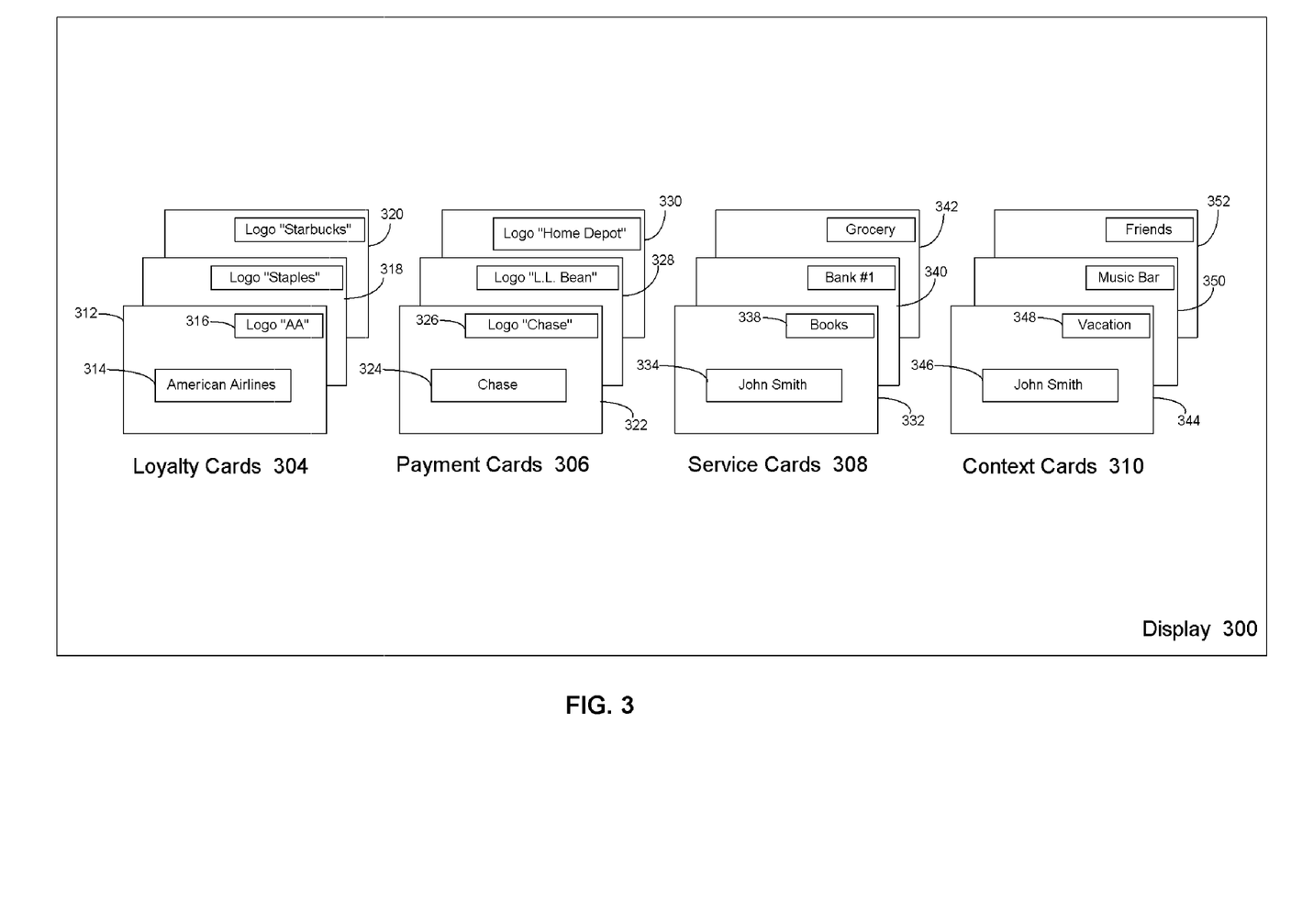
FIG. 3 is a block diagram illustrating an exemplary appearance for a plurality of data files in the form of a deck of cards.

FIG. 3 is a block diagram illustrating an exemplary display on a mobile terminal of a plurality of data files in the form of a deck of cards. In this embodiment, cards of the same type (e.g., the same type of content or intended use) are grouped together and displayed in an overlapped fashion, wherein for each card only a limited subset of all of the data items contained in the associated data file is displayed. In particular, only those data items that are necessary for the user to quickly determine which cards are available for selection are displayed on display 300 thereby providing a measure of privacy against on-lookers.

As shown in FIG. 3, display 300 includes different such groupings for loyalty cards 304, payment cards 306, service cards 308 and context cards 310. It will be readily appreciated that other types of cards, rather than or in addition to the foregoing, may be used in connection with the present invention.

The loyalty cards 304 shown in FIG. 3 are akin to customer relations management ("CRM") cards that a company or enterprise may issue to its customers upon registration. The purpose of these cards is to identify loyal customers and provide those customers with either personalized service and/or a higher level of service than other customers. These cards will typically contain data provided by both the customer and the company during the registration process. As shown in FIG. 2, data provided by the customer may include registration data such as the customer's name, address, etc. Data provided by the company may include an identification code, such as a card number, and an expiration date. Both types of data are stored and maintained by the company/enterprise in its CRM system.

The data in the loyalty card may be accessed by the issuer and, more particularly, by an agent of the issuer, who will typically be the person or device to whom the user presents the loyalty card at, e.g., a point of sale location. The identification code may be used to associate the loyalty card presented by the user with the user's data (e.g., registration data, purchase history, etc.) in the CRM system. The user may also be able to access the data on the card but preferably would be prevented, e.g., by a digital certificate, from modifying some or all of the data. The existence of the certificate may be shown when displaying the card, e.g., as the logo of the certifying authority (e.g., RSA). The certificate also may include a version number and date of issuance.

Loyalty card 312 shown in FIG. 3, which is a frequent flyer card for American Airlines, corresponds to the data file 202 of FIG. 2. However, in this exemplary embodiment, only the name "American Airlines" 314 and the logo "AA" 316 are shown on card 312 when it is presented as one of the plurality of cards shown in FIG. 3. Other loyalty cards 318 and 320 appear in the deck of loyalty cards 304 beneath card 312.

The payment cards 306 shown in FIG. 3 are credit or debit cards issued by a credit card company such as VISA or a monetary institution such as Chase and can be used by an authorized cardholder to purchase goods and/or services. These cards include an identifier that can be verified by the seller to ensure, e.g., that the card is valid or that the presenter is the authorized cardholder. Typically, the data in these cards may be modified only by the issuer. Moreover, some of the data may be encrypted to preserve confidentiality during wireless transmission. Like the above-discussed loyalty cards, in the embodiment shown in FIG. 3, only the name "Chase" 324 and the logo "Chase" 326 are shown on payment card 322 when it is presented as one of the plurality of cards in FIG. 3. Other payment cards 328 and 330 appear in the deck of cards 306 beneath card 322.

The service cards 308 shown in FIG. 3 are cards that are used in conjunction with a service identified by the user/cardholder to personalize the service. A user is very conscious of his use of a service card; he is in a particular service situation when the card is being used and typically initiates the service session. The service card itself may be specific to a particular event or service (e.g., a particular bookstore or chain of bookstores) or, instead, may be generic for services or events of a particular type (e.g., bookstores in general).

As indicated above, the purpose of a service card is to enable personalization of a service without having to disclose too much personal information to the service provider. Thus, a service card includes a user-defined subset of the user's personal information necessary to enable the provision of personalized service. This subset may include pointers to other resources in the mobile terminal 122 and/or in the network 120. A pointer may be to data items on other cards such as, e.g., a bank account number or a home delivery address. The card also may include an expiration date or validity specified by the user. Unlike a loyalty card, a service card may be pseudonymous or anonymous. In other words, a pseudo-identity, rather than the user's real identity, may be associated with the card but, even if so, need not be disclosed to the service provider. Moreover, unlike a loyalty card, the profile information associated with the card is stored and maintained on the user side (e.g., either in the mobile terminal 100 or in the network) rather than on the company/enterprise side.

As will be discussed in detail hereinafter in connection with FIG. 6B, a service card may be generated using either a template that is pre-stored on the mobile terminal 122 or a template that is provided by a service provider. In both cases, the data associated with the card may be at least partly provided by, and accessible only by, the user. In the event that the service card is created using a template provided by the service provider, the template may be partly pre-filled with one or more data items. Typically, the user would be able to supplement the card with additional data items but would be prevented from modifying some or all of the pre-filled data, preferably, as discussed above, through use of a digital certificate.

A service provider may provide service cards or templates at no cost to end-users or, alternatively, may provide them for a fee. Moreover, the service cards or templates may be offered to the user in response to some user activity such as when buying tickets for an event such as an ice hockey match, a concert, an exhibition, a conference, etc. or when the user has expressed his intent to buy such tickets.

Service card 332 of FIG. 3 includes information concerning a bookstore, which the cardholder prefers for purchasing books. In this exemplary embodiment, only the cardholder's name "John Smith" 334 and the service card type "Books" 338 are shown on card 324 when it is presented as one of the plurality of cards shown in FIG. 3. Other service cards 340 and 342 appear in the deck 308 beneath card 324.

Lastly, FIG. 3 includes several exemplary context cards 310. Examples of a user context include: being in traffic, being at work, being in a meeting, having lunch, being with friends, having free time, traveling, etc. A user may create and use a context card to define his visibility towards services or businesses in a particular context, and thus, specify the types of services or businesses that he is receptive to receiving information from when in that context.

For each context, there may be a different set of services or businesses of interest to the user. The user may specify the services or businesses of interest to him by, e.g., including a reference or pointer in the context card to one or more of the above-discussed service cards, and thus, specify those service cards that will be visible to service providers in a particular context. Thus, a context card is a user-defined selection (or, alternatively, a default selection) of service cards usable in the context. It is to be understood that the context card may include pointers to types of cards other than service cards including, but not limited to, the above-discussed payment and loyalty cards, or even other context cards. For privacy reasons, however, the pointer may be to only a portion of the other card, such as a card "code" (e.g., Vacation) rather than the entire card that includes all cardholder information associated with it.

In one embodiment, the user may associate one or more context cards with one or more "triggers" such as a location, a situation (e.g., grocery shopping), an instant in time or any combination thereof, such that the occurrence of the trigger(s) results in the associated context card(s) being automatically displayed to the user for possible selection for use (e.g., transmission). The user is presented with one or more "suggested" context cards relevant to the context specified by the triggers. The user may then select a context card either from those presented to the user in response to the trigger or, alternatively, from other context cards stored in memory. Alternatively, a trigger may result in the automatic selection of a context card by the user terminal without any input from the user.

In one embodiment, a service provider receives the information associated with the context card, e.g., during "service discovery", and provides information concerning services that it offers that correspond to the services of interest associated with the context card. In this manner, context cards increase the cardholder's awareness about services of interest to him in his current context.

The user may manually create or select a context card for a given context, and thus, manually tailor his visibility toward such services when in that context. For example, upon entering a meeting, the user may select a "meeting" context card, and thereby advise all available services that the user does not wish to be disturbed. In an alternate embodiment, the mobile terminal 122 will automatically create or select the appropriate context card for the user based upon the "sensed" user context, as will be discussed in detail hereinafter in connection with FIG. 6C. Of course, the user may both activate and switch off the automatic creation or selection of a context card.

Context card 344 shown in FIG. 3 includes information concerning the user while on vacation. In the embodiment of FIG. 3, only the cardholder's name "John Smith" 346 and the context "Vacation" 348 are shown on card 346 when it is presented as one of the plurality of cards shown in FIG. 3. Other cards 350 and 352, corresponding to contexts of a "music bar" and "friends", respectively, appear in the deck of context cards 310 beneath card 344.

Although the above-discussed cards contain what could be considered to be sensitive personal information that is being disclosed to a service provider, it should be remembered that the cardholder determines the data items that are displayed or transmitted when the card is used. Moreover, additional privacy settings can be used to define rules that the service provider would need to follow when using the information associated with a card. For example, one privacy setting may be that the information disclosed in a service situation cannot be forwarded to a third-party. Another privacy setting may include user-defined expiration and validity dates/times after which a service provider must delete the information from its databases.

In one embodiment, the user may specify the order of the cards in each deck of FIG. 3, e.g., by highlighting a card and dragging it to a different position in the deck or selecting an option such as "place on top" from, e.g., a pull-down menu. Alternatively, the mobile terminal 122 may automatically change the order based on information relating to the user's context such as his location, calendar, intent, etc. For example, the mobile terminal 122 may include a GPS system for determining the user's location vis-à-vis services for which the user has a stored card. The mobile terminal 122 would then display on the top of the deck the card of the service nearest the user's current location. Alternatively, either the network 120 or a service provider, rather than the mobile terminal, may detect the terminal's proximity to such services. The service provider or network 120 may accomplish this, e.g., when the mobile terminal responds to a cell-broadcasted message that uses Bluetooth, wireless LAN, wireless WAN or a similar method of communication. An indication of the user's proximity to a service may then be sent to the mobile terminal for its use in ordering or re-ordering the cards on the display.

It will be understood the user may specify other characteristics to control how the cards of FIG. 3 are displayed in connection with the user's proximity to a service in addition to, or rather than, the order of the cards such as size, color and/or animation (e.g., blinking lights).

The cards are presented on display 300 as shown in FIG. 3 preferably in response to an authenticated user request (e.g., entry of a password) to show all existing cards (or some subset of all such cards). In the event that the data files corresponding to the cards are stored in a network repository, the user request would initiate a network connection and use a URL of the repository to retrieve the data items that are necessary for displaying a plurality of cards in the manner shown in FIG. 3 (i.e., in an overlapped fashion with only those data items showing necessary for the user to quickly determine which data files are available).

Figure 4A:
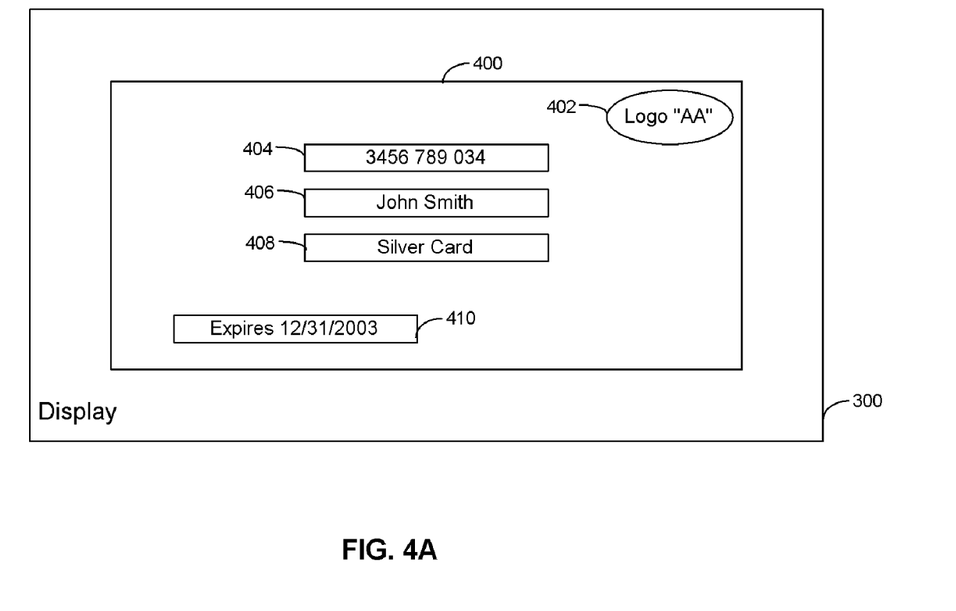
FIGS. 4A and 4B are block diagrams illustrating an exemplary appearance for a data file in the form of a single card when selected for use from the deck shown in FIG. 3.
Figure 4B:
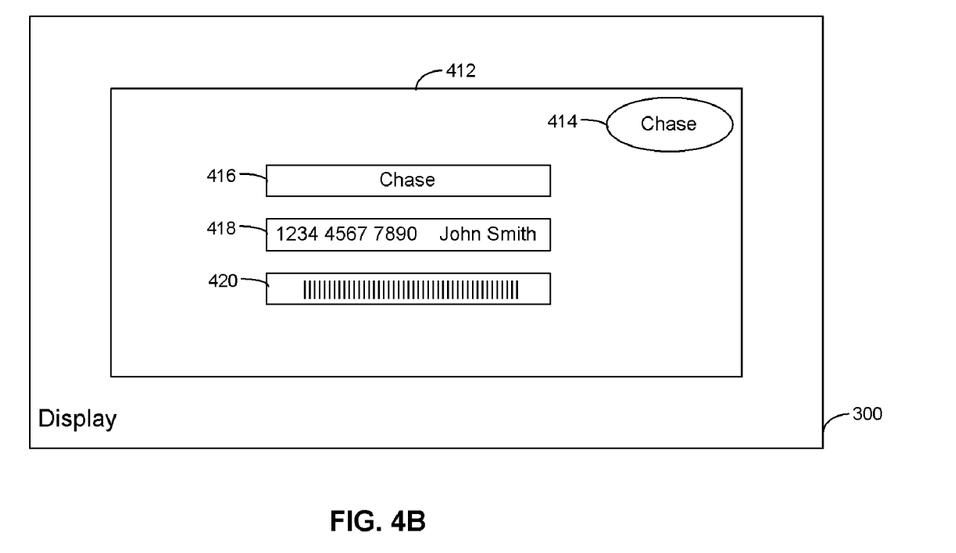

FIGS. 4A and 4B are block diagrams illustrating an exemplary presentation for a data file in the form of a single card when selected from the deck shown in FIG. 3.

A user may select one or more of the cards from the display of FIG. 3 either for usage (e.g., display or transmission) or for modification. Card selection may be accomplished by highlighting one of the cards shown in FIG. 3, e.g., by moving a pointer directly over the card and selecting an option such as display card, transmit card or modify card from, e.g., a pull-down menu. It should be understood that transmission of a card includes making the card available for transmission, e.g., during service discovery. If the user selects a card for modification, all of the data items associated with the card may be displayed to the user. The user may then modify any data on the card that is modifiable by the user including specifying whether or not such data can be displayed or transmitted upon card usage.

FIG. 4A depicts the American Airlines loyalty card discussed above in connection with FIGS. 2 and 3. When selected for display from the plurality of cards shown in FIG. 3, the American Airlines loyalty card 312 is presented on the display 300 of the user's mobile terminal 122 as shown in FIG. 4A. As can be seen, the card 400 is depicted with data items in addition to those shown in FIG. 3 that the user identified (upon either card creation or card modification) as permissible to display or transmit when using the card. As shown in FIG. 4A, the card 400 includes the American Airlines logo 402, the card number 404, the cardholder's name 406, the level of service 408 and an expiration date 410. It should be noted that less than all of the data items contained in the associated data file 202 (FIG. 2) are shown on the card of FIG. 4A. Thus, the user has identified that data relating to the attributes "address", "phone_home" and "reserv" in data file 202 should not be displayed or transmitted upon usage.

FIG. 4B depicts the Chase payment card discussed above in connection with FIG. 3. When selected for usage from the display of FIG. 3, the Chase payment card 412 is presented on the display 300 of the user's mobile terminal 122. The card 412 includes the Chase logo 414, the card name 416, the cardholder's name and card number 418 and a barcode 420 containing one or more data items such as the card number. In this embodiment, once selected and displayed, the barcode 420 may be scanned by a standard barcode reader.

Figure 5:
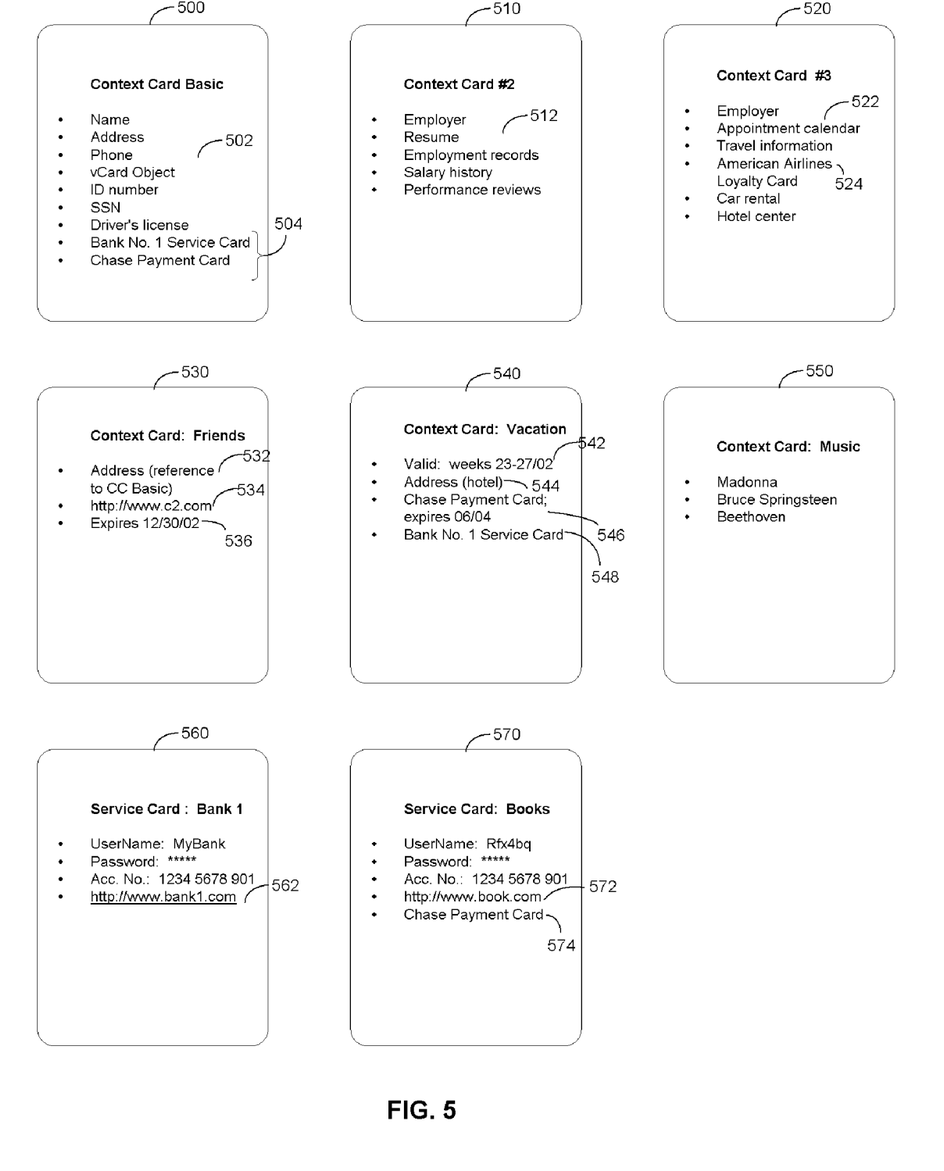
FIG. 5 is a block diagram illustrating exemplary cards for use in connection with the present invention including context cards and service cards.

FIG. 5 is a block diagram illustrating exemplary cards of various types including context cards and service cards.

An exemplary basic context card 500 including basic data items 502 of the cardholder is shown in FIG. 5. This card 500 may be applicable to a variety of contexts. It includes references 504 to other cards including the "Chase" payment card and "Bank #1" service card. Context Card #2 510 is a context card containing data items 512 that the cardholder may use when in an employment context. Context card #3 520 is a context card containing data items 522 used when traveling on business. It includes a reference 524 to the user's American Airlines loyalty card.

The context cards 530-550 shown in FIG. 5 are specific to leisure-type contexts rather than work-related contexts. For example, context card "Friends" 530 may be used to share information with friends. It includes a reference 532 to the user's address in the "Basic" context card 500. Only those portions of the basic context card 500 that the user has identified upon card creation or modification as being transferable, however, will be transmitted to the user's friends. The "www-address" 534 may be the home page of the cardholder where pictures of him and/or his family can be viewed, which, as indicated by context card 530, the cardholder would like to share with his friends. The "friends" context card 530 also includes an expiration date 536 specified by the cardholder.

Context card "vacation" 540 includes the dates 542 that the cardholder will be on vacation. These dates correspond to the dates that the card is valid. Also included on the card are the address 544 of the hotel where the cardholder will be staying and the payment card 546 that he will use while on vacation. Card 540 also includes a reference to the Bank No. 1 service card, which can be used by the cardholders e.g., to receive notification from his bank of branches located in the area where he will be vacationing.

Lastly, context card "music" 550 includes the cardholder's music preferences, which can be used, e.g., to receive coupons for music recorded by his favorite artists when visiting a record shop.

Also shown in FIG. 5 are two exemplary service cards—namely, a service card for bank #1 560 and a service card for books 570. The service card for bank #1 560 is a card that contains a variety of data items relating to the cardholder's bank account including a www-address 562 for on-line banking. The service card for books 570 includes a variety of data items relating to the cardholder's favorite bookstore including the bookstore's www-address 572 and a reference 574 to the cardholder's Chase payment card for use in purchasing books from this bookstore.

Figure 6A:
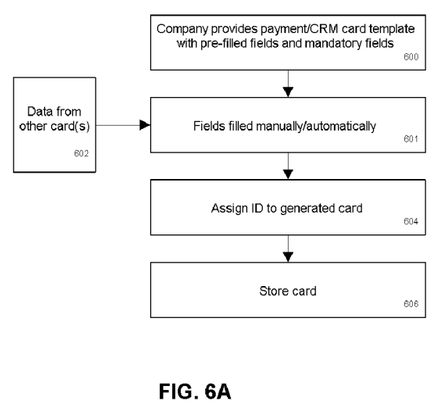
FIGS. 6A-C are flowcharts illustrating exemplary processes for generating various types of cards.
Figure 6B:
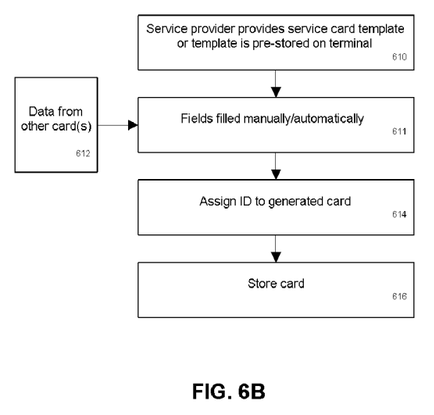
Figure 6C:
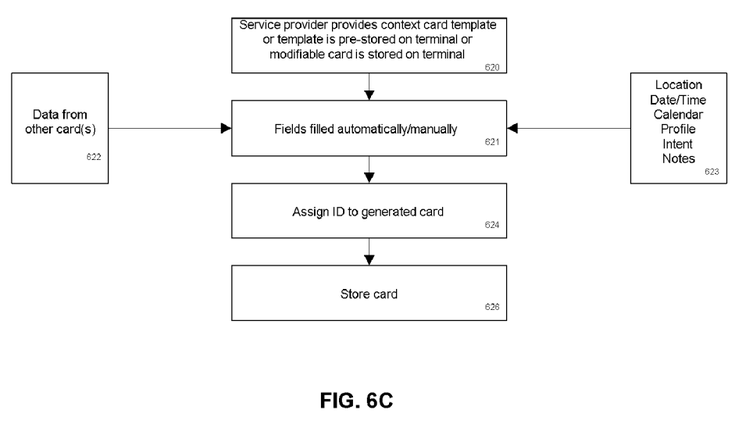

FIGS. 6A-C are flowcharts illustrating exemplary processes for generating various types of cards.

FIG. 6A is an exemplary method for generating either a payment card or a loyalty card. As shown in FIG. 6A, in step 600, a company provides the user with a payment card or loyalty card template via a wireless connection. The connection may be via wireless PANs, LANs or WANs. The template includes pre-filled fields with data items (e.g., attributes and associated data) supplied by the service provider and mandatory fields requiring information to be supplied by the user. The template may also include optional fields, which may be filled in by the user.

In step 601, the fields are filled either manually by the user or automatically by mobile terminal 122 using, in step 602, data from other card(s). Data from other cards may be used whenever the card being created includes attributes that exist under the identical name together with associated data in the data files of existing cards. However, if the same attribute is associated with different data in the data files of the existing cards, then the user may be given the opportunity to select which data should be used in generating the new card. For example, if the data associated with the attribute "NAME" is "John Smith" on one card and "John S. Smith" on another card, then the user is shown both data (or provided with the identity of the cards containing the different data) and given the opportunity to select which one should be used on the new card. In addition, the user may be given the opportunity to provide data different than that shown on any of the existing cards, provided of course that the card being generated permits such substitution. However, this would not likely be the case for payment and loyalty cards. In step 604, mobile terminal 122 assigns an identifier to the newly generated card and, in step 606, stores the card either locally or in the network as discussed above in connection with FIG. 1.

FIG. 6B is an exemplary method for generating service cards. The generation of a service card is essentially the same as the generation of a loyalty card or payment card discussed above in connection with FIG. 6A. The primary difference, however, is that in step 610, a template for a service card may be either provided by a service provider or, unlike the loyalty or payment cards, pre-stored on the mobile terminal. Otherwise, steps 611-616 of FIG. 6B are identical to steps 601-606 of FIG. 6A.

FIG. 6C is an exemplary method for generating context cards. As shown in step 620, a new context card may be generated in several different ways. For example, a service provider may provide the mobile terminal with a context card template in response to a user request. The request may be a response to a cell-broadcasted message based, e.g., upon the detected location of the mobile terminal. Alternatively, a context card template may be pre-stored on the user's mobile terminal. In yet an alternate embodiment, a modifiable context card may be pre-stored on the mobile terminal, and thus, can be used in creating a new context card.

The template for a context card may include both pre-filled fields and mandatory fields as discussed above in connection with FIG. 6A. The context card may also include other fields, such as optional fields, which a user may fill in at his discretion. The pre-filled fields may include limitations on the validity of the card such as an expiration date or a limitation on the location where the card may be used. In this regard, the service provider may design the card to be deleted from memory after a specified time or upon leaving a specified location. In step 621, the fields are filled either manually by the user or automatically by mobile terminal 122. Alternatively, some fields may be filled manually while other fields are filled automatically. Filling fields includes, among other things, using data from other card(s), such as including pointers to information associated with one or more service cards.

As shown in step 623, filling in the fields of either a template or a modifiable card may also include taking into account the user's intent in the context associated with the card as either specifically disclosed by the user (e.g., when completing a template or registering a card) or discerned from the user's context. The user's context, in turn, may be determined from information such as his location, the current date and time and his electronic calendar. This additional information also may be used as a trigger for presenting a context card to the user for possible selection, as discussed above in connection with FIG. 3. For example, the user's location, current date/time and calendar may indicate that the user's context is "in traffic". It would then be likely that the user intends to avoid traffic jams, and thus, would want to be notified of any delays en route to his destination. This information then could be incorporated into a context card in defining the user's visibility toward relevant services, in this case, local traffic advisory services. The user may specify his destination in the context card so as to only receive traffic information that is relevant to his itinerary. Also, the user's notes concerning a particular context may be transferred onto the context card being generated. For example, if the user's context is "grocery shopping", the notes may include a shopping list and the user may select one or more items from the list to indicate that he is interested in receiving special offers concerning those items.

Once the appropriate data items have been added to the context card, then, in step 624, mobile terminal 122 assigns an identifier to the newly generated card and, in step 626, stores the card either locally or in the network.

Figure 7:
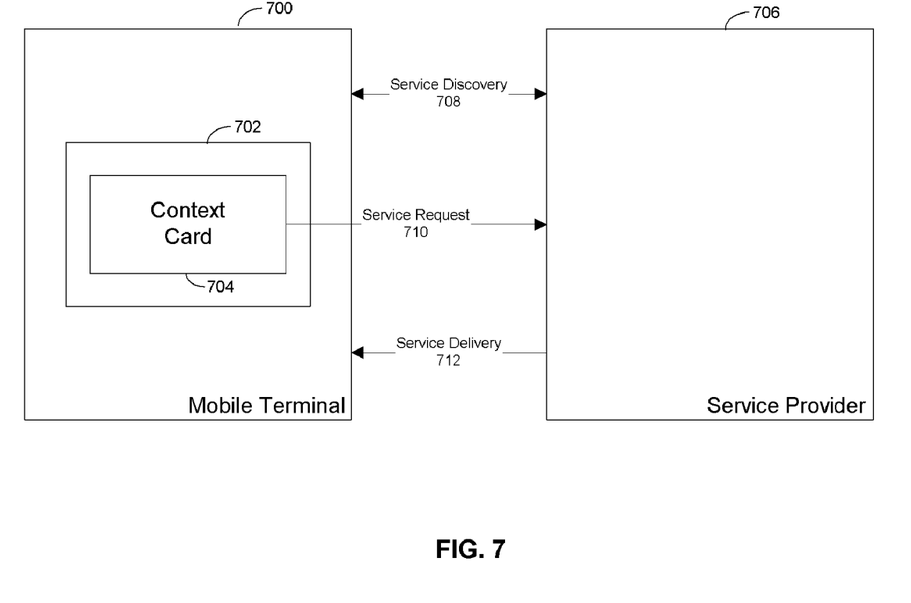
FIG. 7 is a block diagram illustrating an exemplary process of using a context card for receiving a service.

FIG. 7 is a block diagram illustrating an exemplary process of using a card for a service and, more particularly, for using a context card. As shown in FIG. 7, a mobile terminal 700 includes a display 702 and a context card 704 selected (manually or automatically) for the user's present context. Selection of the context card may be from amongst a plurality of cards as discussed above in connection with FIG. 3. In one embodiment, card selection is initiated by the occurrence of one or more triggers associated with the context card. The triggers may comprise one or more of the following: location, situation, date, time, etc. The occurrence of these triggers results in the associated context card being displayed to the user as a suggested card for possible user selection for use. The user may then select a context card from among those suggested or from other context cards stored in memory. Alternatively, the trigger(s) may instead result in the automatic selection of a context card.

In step 708, the mobile terminal 700 comes within transmission proximity of a service provider 706. Service discovery occurs during which, in the embodiment of FIG. 7, the mobile terminal 700 receives an indication of the service(s) offered by the service provider 706. The mobile terminal 700 then determines whether one or more of the offered services is suitable for the user's context as indicated by the previously selected context card. This determination may include reviewing both the data contained in the context card and any other cards/data referenced therein, such as one or more service cards relevant to the user's current context. If an offered service suits the user's context, then, in step 710, mobile terminal 700 transmits a service request containing the context card 704 to the service provider 706. In step 712, the service provider 706 transmits the service to mobile terminal 700.

In an alternate embodiment, mobile terminal 700 automatically transmits the context card to the service provider 706 during service discovery. Based on the information in the context card 704, the service provider 706 then determines whether it offers a service suitable for the user's context. Once again, this may include reviewing the data contained in the transmitted context card and any other cards/data referenced therein. If a suitable service is offered, then the service provider 706 sends the offer to mobile terminal 700 and awaits receipt of a service request. Unlike in the previous embodiment, however, the service request in this embodiment would not include the context card, given that it was transmitted to service provider 706 earlier during service discovery.

Figure 8:
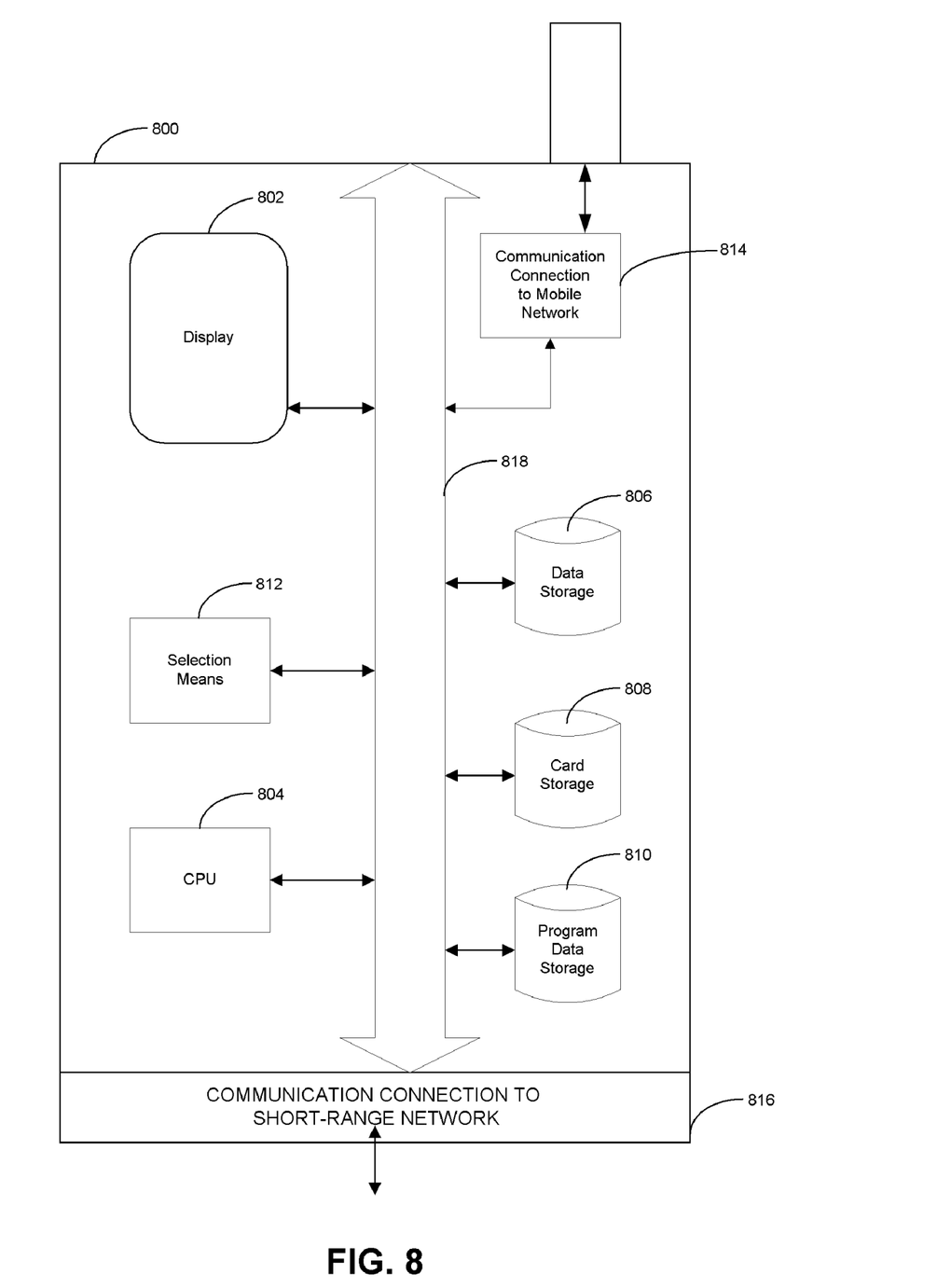
FIG. 8 is a block diagram illustrating an exemplary mobile terminal in accordance with one embodiment of the present invention.

FIG. 8 is a block diagram illustrating an exemplary mobile terminal in accordance with one embodiment of the present invention. As shown in FIG. 8, mobile terminal 800 includes a display 802, preferably one with a touch screen capability, as is well-known in the art. The display 802 preferably is also capable of presenting textual, graphical and/or image data, including presentation formats corresponding to the cards of the present invention.

Terminal 800 also includes a CPU 804 for controlling data processing and transfer operations within terminal 800. As shown in FIG. 8, terminal 800 further includes associated storage devices (806, 808, 810) for storing programs and various data for use in accordance with the present invention. Card storage 808 stores cards (e.g., data items and, in one embodiment, an associated presentation format) that have been either created by the user or downloaded from a service provider. Program data storage 810 stores programs for data processing and transfer in general and, more particularly, for creating and using cards, e.g., in the manner discussed above in connection with the exemplary processes depicted in FIGS. 6A-6C and 7. Data storage 806 stores data such as user data, card templates, user location information, messages received from service providers, presentation format data, graphical or image data and the like. Alternatively, card templates may be stored in card storage 808 as cards yet to be completed for use by the user of the mobile terminal 800.

Mobile terminal 800 also includes selection means 812 (e.g., a user interface, such as a keypad), which comprises numerous function keys such as alpha-numeric keys and directional (arrow) keys for scrolling through and selecting from among data contained in storage devices (806, 808, 810) and/or displayed on display, as will be discussed further below in connection with FIG. 8. Alternatively, a pointing device may be used for manipulating stored and/or displayed data.

As further shown in FIG. 8, mobile terminal 800 also includes a connection means 814 for communicating with a mobile network, such as a wireless WAN (e.g., GSM, GPRS, etc.). It also includes a connection means 816 for communicating with a short range wireless network such as a Personal Area Network (e.g., IrDA or Bluetooth PANs) or a wireless LAN (e.g., wireless IEEE 1394, IEEE 802.11 or HiperLAN/2).

The above-described elements of terminal 800 are, in one embodiment of the invention, interconnected via a data transfer bus 818. It will be readily appreciated that mobile terminal 800 also includes conventional hardware and functionality, which are employed in operating mobile terminal 800 as a mobile phone, but which are well known to those skilled in the art, and thus, are not shown in FIG. 8. Moreover, terminal 800 also may include means for password protecting one or more data items selected for display, storage, transmission or other processing operations.

Returning to the selection means 812 shown in FIG. 8, these means enable a user to perform a variety of functions such as those already discussed including but not limited to selecting data items from storage 806 for association with a card, selecting a card template from among those received from a service provider for downloading into storage 806, selecting a card template from storage 806 for creating a card and selecting a created or downloaded card from storage 808 to be displayed and/or transmitted to a service provider or another mobile terminal. For example, mobile terminal 800 may receive card templates via connection means (814, 816) and the user may select a template to be stored in data storage 804 (or card storage 808) and/or displayed on the display 806. The template fields may then be filled with data from data storage 804 either manually by the user or automatically under the control of the processor 802 in accordance with the programs stored in data storage 808. The user also may select one or more cards from storage for transmission to either another wireless device or a service provider via connection means (814, 816). The user also may use the selection means 812 to select a presentation format for data items (i.e., attributes and data) in cases where a plurality of presentation formats are available for displaying data items.

As discussed above, in one embodiment of the present invention, mobile terminal 800 may receive periodic updates of data relating to its present location via, e.g., communication connection means 814 (e.g., a WAN). This location data then may be stored in data storage 806 and used in accordance with the present invention in displaying a relevant context card from card storage 808 for possible user selection. Alternatively, the location data may result in an automatic selection by terminal 800. As discussed above in connection with FIG. 3 and elsewhere, the displaying of a suggested card or the automatic selection of a card also may depend upon other trigger data, such as time, either alone or in combination with location information.

The many features and advantages of the present invention are apparent from the detailed specification, and thus, it is intended by the appended claims to cover all such features and advantages of the invention which fall within the true spirit and scope of the invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

We claim:

1. An apparatus comprising:
    a memory having program code stored thereon; and
    a processor disposed in communication with the memory for carrying out instructions in accordance with the stored program code,
    wherein the program code, when executed by the processor, causes the processor to perform:
    storing a plurality of card representations, wherein each of the card representations is associated with a plurality of data items;
    displaying the plurality of card representations;
    receiving a selection of one of the plurality of card representations; and
    transmitting a plurality of data items associated with the selected one of the card representations to a service provider to obtain a service.

2. The apparatus of claim 1, wherein the program code, when executed by the processor, further causes the processor to perform:

transmitting the selected one of the plurality of card representations to the service provider to obtain the service.

3. The apparatus of claim 1, wherein the selected one of the plurality of card representations is displayed without the associated data items.

4. The apparatus of claim 1, wherein the selected one of the plurality of card representations is displayed together with the associated data items depicted thereon.

5. The apparatus of claim 1, wherein the plurality of card representations are stored on the apparatus and the data items are stored in a data network.

6. The apparatus of claim 1, wherein the plurality of data items are password protected.

7. The apparatus of claim 1, wherein the plurality of data items are cryptographically protected.

8. The apparatus of claim 1, wherein the apparatus comprises a mobile wireless terminal.

9. An article of manufacture comprising a computer readable medium containing program code that when executed causes a processor to perform:
   storing a plurality of card representations, wherein each of the card representations is associated with a plurality of data items;
   displaying the plurality of card representations on a user device;
   receiving a selection of one of the plurality of card representations; and
   transmitting a plurality of data items associated with the selected one of the card representations to a service provider to obtain a service.

10. The article of manufacture of claim 9, wherein the program code, when executed, further causes the processor to perform:
   transmitting the selected one of the plurality of card representations to the service provider to obtain the service.

11. The article of manufacture of claim 9, wherein the selected one of the plurality of card representations is displayed without the associated data items.

12. The article of manufacture of claim 9, wherein the selected one of the plurality of card representations is displayed together with the associated data items depicted thereon.

13. The article of manufacture of claim 9, wherein the plurality of card representations are stored on the user device and the data items are stored in a data network.

14. The article of manufacture of claim 9, wherein the plurality of data items are password protected.

15. The article of manufacture of claim 9, wherein the plurality of data items are cryptographically protected.

16. The article of manufacture of claim 9, wherein the user device is a mobile wireless terminal.

* * * * *